United States Patent [19]

Grangeat et al.

[11] Patent Number: 5,408,511
[45] Date of Patent: Apr. 18, 1995

[54] PROCESS FOR THE RECONSTRUCTION OF THREE-DIMENSIONAL IMAGES OF AN OBJECT BY MEASUREMENTS USING A CONICAL RADIATION AND A BIDIMENSIONAL DETECTOR ARRAY

[75] Inventors: Pierre Grangeat, Saint Ismier; Régis Guillemaud, Grenoble; Philippe Rizo, La Tronche, all of France

[73] Assignee: Commissariat A L'Energie Atomique, France

[21] Appl. No.: 65,142

[22] Filed: May 21, 1993

[30] Foreign Application Priority Data

Jun. 5, 1992 [FR] France ................... 92 06844

[51] Int. Cl.⁶ ............... A61B 6/03; G01N 23/083
[52] U.S. Cl. ..................... 378/19; 378/901; 250/363.02
[58] Field of Search .............. 378/901, 19, 62; 250/363.02, 363.03, 363.04, 370.09

[56] References Cited

U.S. PATENT DOCUMENTS

| | | | |
|---|---|---|---|
| 4,672,651 | 6/1987 | Horiba et al. | 378/62 |
| 4,752,691 | 6/1988 | Hawman | 250/363 |
| 4,961,208 | 10/1990 | Okada | 378/17 |
| 5,001,347 | 3/1991 | Hsieh | 250/363.10 |
| 5,170,439 | 12/1992 | Zeng et al. | 382/6 |
| 5,297,035 | 3/1994 | Ichihara | 250/363.04 |

OTHER PUBLICATIONS

Comparison of Two Three-Dimensional X-Ray Cone-Beam Reconstruction Algorithms With Circular Source Trajectories By: Grangeat et al, Optical Society of America vol. 8, No. 10, Oct. 1991, pp. 1639–1648.
Recentes Evolutions de la Tomographie 3D En Geometrie Conique By: Grangeat et al Treizieme Colloque sur le Traitement du Signal et des Images, Juan–les–Pins Du 16 AU 20 Sep. 1991 pp. 817–820.
Cone–Beam Tomography: Recent Advances and a Tutorial Review By: Bruce D. Smith, 2417 Optical Engineering 29 (1990) May No. 5, Bellingham, Wash. pp. 524–534.
CT Fan Beam Reconstruction With a Nonstationary Axis of Rotation By: Concepcion et al, 8197 IEEE Transactions on Medical Imaging 11 (1992) Mar., No. 1, NY, pp. 111–116.

*Primary Examiner*—Paul M. Dzierzynski
*Assistant Examiner*—David Vernon Bruce
*Attorney, Agent, or Firm*—Hayes, Soloway, Hennessey, Grossman & Hage

[57] ABSTRACT

Process for the reconstruction of three-dimensional images of an object (3), in which the reconstruction is obtained by calculating sums of projections on planes extracted from a conical attenuation radiation traversing the object, or an emission from the object in accordance with a conical collimation. The bidimensional detector array (4) used for this purpose has a random inclination ($\xi$) with respect to the rotation axis defining the mark in which the image is reconstructed as a result of a voluntary choice. Formulas are given making it possible to obtain a limited distortion reconstruction after measuring the displacement parameters of the array and the conical radiation beam. The position errors resulting from construction defects are also taken into account in the calculations after measurement. A parameter measurement protocol and the associated calculation process are also described.

9 Claims, 6 Drawing Sheets

PROCESS FOR THE RECONSTRUCTION OF THREE-DIMENSIONAL IMAGES OF AN OBJECT BY MEASUREMENTS USING A CONICAL RADIATION AND A BIDIMENSIONAL DETECTOR ARRAY

The invention relates to a process for the reconstruction of three-dimensional images of an object with the aid of measurements using a conical radiation and a bidimensional detector array.

It can be looked upon as an improvement to the inventions described in earlier patents belonging to the Applicant (European Patent 292,402 and French Patents 9,014,957 and 9,014,958).

A process for the reconstruction of the image of a three-dimensional object on the basis of a series of irradiations by a conical or cone beam rotating about the object and which strikes a screen covered with a bidimensional detector array is more specifically described in the first of the above patents. An algorithm using the inversion of what is called the primary or first derivative of the Radon transform of the radiation attenuation of the beam through the object to be reconstituted is used.

However, the calculations described therein are no longer valid when the detector array is not correctly positioned with respect to the trajectory, or when the focal point is displaced from its theoretical position, because the orthogonal projection line of the focal point on the detector array (the focal axis) no longer passes through the origin of the object mark. A large part of the calculations takes place in this mark, which is chosen on the rotation axis of the focal point and the detector array when they traverse circular trajectories and in the plane of the trajectories when the latter are coplanar. However, these situations are extremely frequent, because they can result from alignment and positioning defects of the mechanisms carrying the source and the screen, which it is not always possible to correct.

However, these situations are even voluntarily sought. A standard example is that of the examination of the interior of the skull, where the detector array passes through a trajectory located on a circle, whose axis is parallel to the patient axis.

It is wished to be able to use the apparatus for examining internal regions at different heights. For cost and simplicity reasons, it is advantageous to provide the detector array with a single collimator for all examination situations.

However, distortions of the modulation transfer function accompanying the measurements and the reconstruction and therefore distortions of the image are less significant in the plane of the trajectory of the focal point, which explains why it is wished to intersect the region to be examined by said plane.

The aim is then to regulate the inclination of the detector array on the patient's skull by arranging it obliquely so that the focus follows a circular trajectory, whose height is regulated as a consequence thereof. Therefore the detectors follow at the shoulders larger diameter trajectories than those at the top of the skull, which makes it possible to introduce the head more deeply into the apparatus and therefore lower the plane of the trajectory of the focus in the direction of the neck. If the focus corresponds to a material radiation source, it is sufficient to connect it to the detector array by a rigid mechanical connection.

Image reconstruction calculations are much more complicated under more general geometrical conditions. Certain publications mention these or refer to them at least in certain special cases. Thus, a description is given as to how to operate when the reconstruction is performed by the Feldkamp algorithm in which the cone beam is broken down into a stack of fan-shaped, planar beams (article by Manglos, Jaszczak and Greer "Cone-beam SPECT reconstruction with camera tilt", published in 1989 in Physics in Medicine and Biology, No. 34(5), p.625 and the abstract of Cao and Tsui published in 1991 in the Journal of Nuclear Medicine, No. 32(5), p.1066) or by an iterative calculation algorithm in which the contribution of each point to the attenuation of the radiation is calculated from an initial value by calculating at each stage correction factors deduced from the relationship between the measurements and projections of the estimates of the function obtained in the preceding stage (article by Manglos, Jaszczak and Macafee "Maximum likelihood reconstruction for cone-beam SPECT with camera tilt", published in 1989 in IEEE Transactions on Nuclear Science, No. 36(1), p.1117), but nothing would appear to have been done in the case where the algorithm involves the inversion of the Radon transform of the function or its primary derivative.

The invention fills this gap, both in the case of a cone beam emitted from an external point source and which traverses the object whilst being attenuated and in the equivalent case of a bidimensional detector array collimated towards a single focal point behind the object and sensitive to the radiation of a radiation emitter product which impregnates the object, like a marker contained in a liquid injected into the patient and which spreads into an organ to be investigated after being transported by the vein system. In addition, the invention is applicable to a random number of detector arrays, each contributing to part of the measurement and which are displaced by different quantities.

Thus, in its most general form the invention relates to a process for the reconstruction of three-dimensional images of an object defined by values taken by a function on the points of the object, the function having a conical radiation property with a focal point and passing through the object, in which the function is calculated by means of sums of the function on parametrized plans passing through at least one point of the object and defined in an object mark having an origin, the process involving at least one series of measurements in different positions of the focal point around the object, each sum of the function on said parametrized planes in the object mark being calculated from at least one of the measurements, each of the measurements being carried out with a bidimensional detector array of the radiation oriented towards the focal point and which is displaced on a circular trajectory about the object perpendicular to a rotation axis, the focal point being displaced at the same time as the detector array so as to be projected orthogonally on a fixed point of the detector array, an inversion algorithm being used for again finding the value assumed by the function on the points of the object with the aid of sums of the function on the parametrized plans, the algorithm involving stages of determining at least one position of the focal point belonging to each of said parametrized plans, characterized in that the focal axis, defined as the orthogonal projection line of the focal point on the array passes on one side of the origin and in that the determination stages involve calculations using parameters expressing the variation between the focal axis and the origin and the inclination between the focal axis and the rotation axis, whereby said inclination can be of a random nature.

The acquisition geometry is described on the one hand by a set of intrinsic parameters, namely the focal distance FGd, the position Gd of the orthogonal projection of the focal point F on the detector array, the sampling spacing or interval separating the detectors on the array, and on the other hand by a set of extrinsic parameters used for positioning the focal point and the detector array in question with respect to the rotation axis, namely the position of the conical projection point Od of the origin O on the detector array, the distance FG separating the focal point and the plane parallel to the detector and containing the origin O of the object mark, the inclination of the vector perpendicular to the detectors with respect to the rotation axis, the rotation angle of the lines of the detector array relative to the intersection line of the rotation plane of the focal point with the detector and the angular position of the first acquisition.

BRIEF DESCRIPTION OF THE DRAWINGS

The invention is described in greater detail hereinafter relative to non-limitative embodiments and with reference to the attached drawings, wherein show.

DETAILED DESCRIPTION OF THE INVENTION

Figure 1:
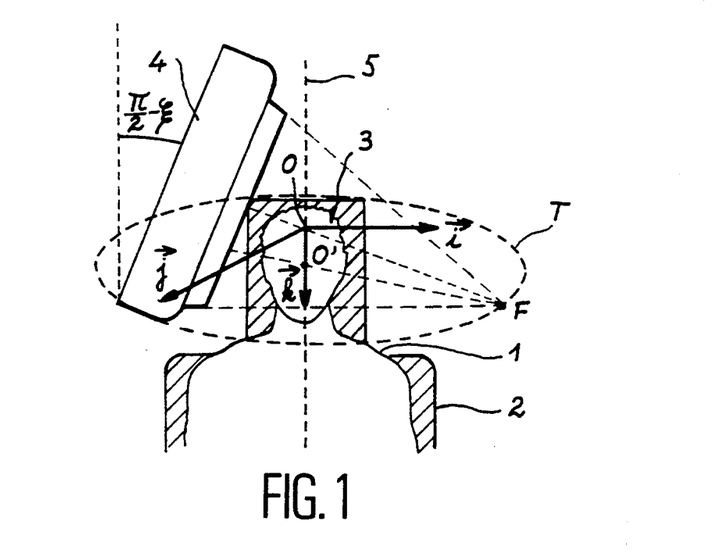
FIG. 1 a use example of the invention.
Figure 2:
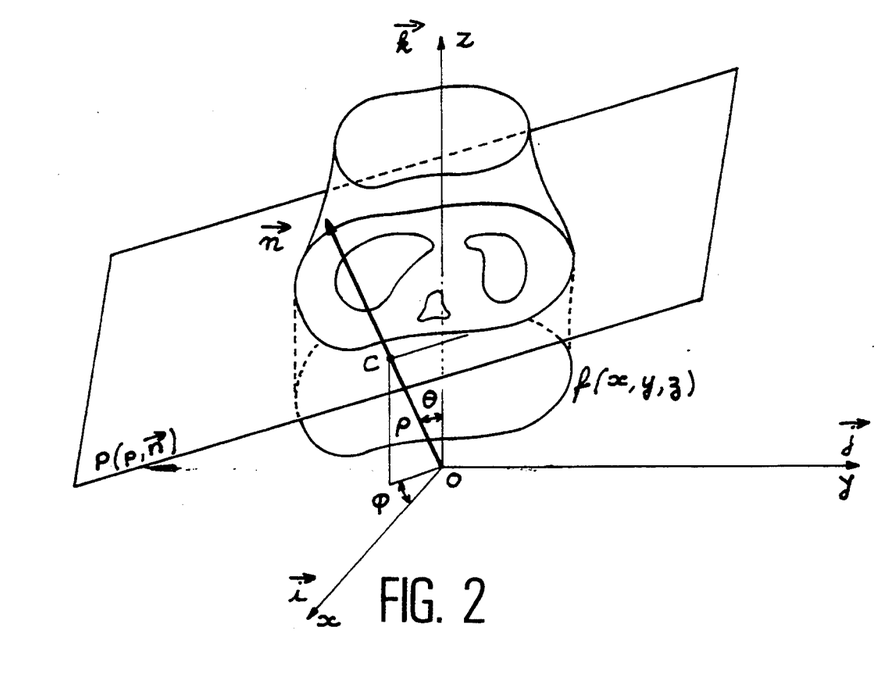
FIGS. 2 to 7 geometrical elements used and on which comments are made in the remainder of the text.
Figure 3:
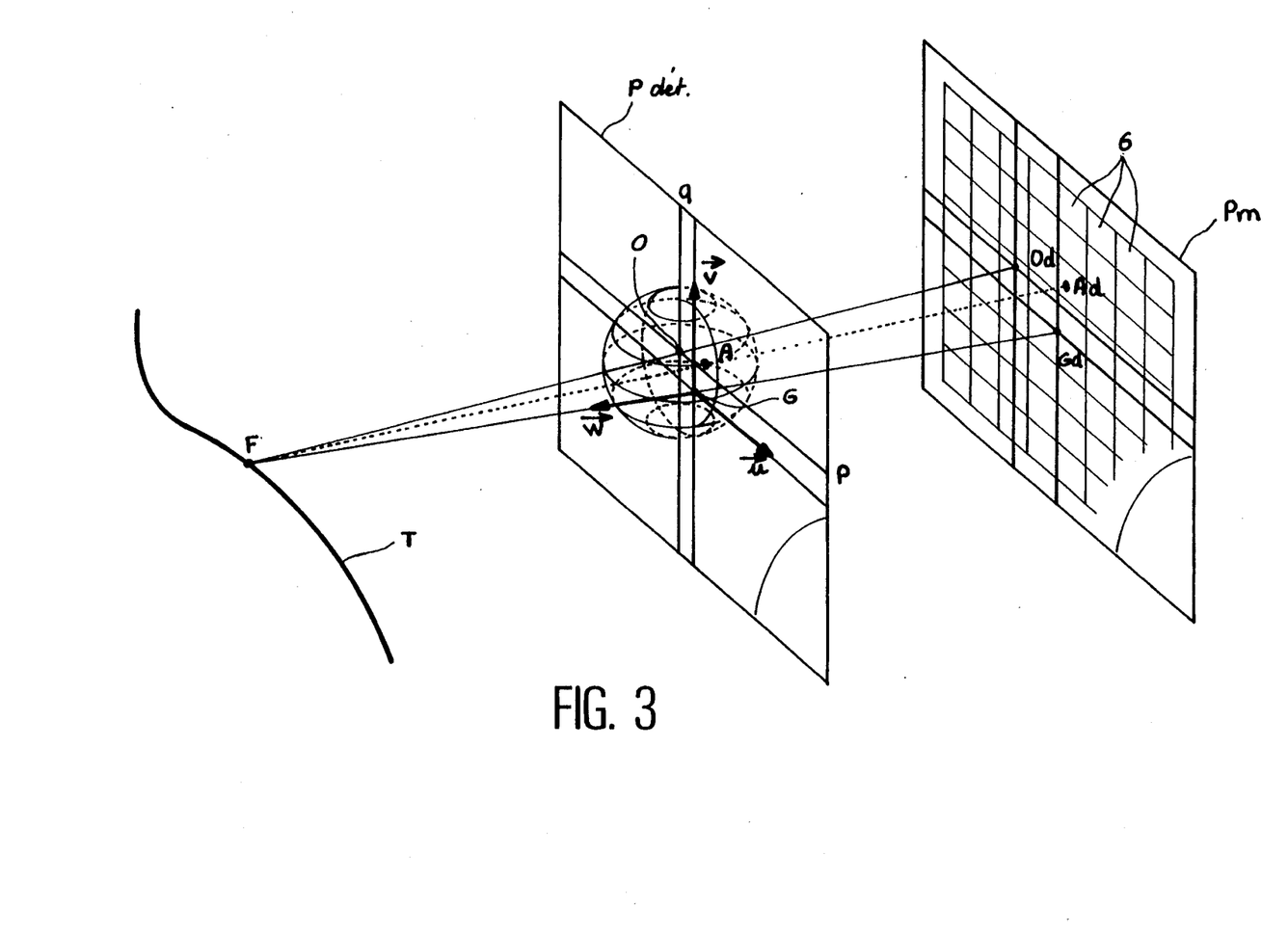

Therefore FIG. 1 shows a patient 1 stretched out on a table 2 and whose head 3 is examined with the aid of a gamma ray camera 4, which rotates about the head 3 in accordance with a rotation axis 5 established in the patient height direction. The camera 4 is essentially formed by a planar or more generally bidimensional array of detectors collimated in such a way that the rays which they receive all converge towards a focal point or focus F. It is fixed to a not shown, mechanical, circular structure, but whereof the aforementioned patents provide examples, in such a way that the focus F is integral with the camera 4 and passes through a trajectory T in the form of a circular orbit perpendicular to the rotation axis 5 and whose centre O' belongs to said axis. The trajectory T here extends level with the brain of the patient 1. The camera is inclined by an angle $$\left(\frac{\pi}{2} - \xi\right)$$

relative to the rotation axis 5 and the angle $\xi$ will be defined hereinafter. It is assumed to be equal to $\pi/2$ in the aforementioned patents. The apparatus associated with this invention is preferably constructed in such a way as to make it possible to bring about a random modification of the angle $\xi$ in order to displace the trajectory T and place it level with the region of the head 3 in which there is an interest, because a greater clarity is obtained at said trajectory T.

The patient image points are defined by their coordinates in an object reference mark, which is a Cartesian system of origin O placed on the rotation axis 5 and defined by three directional vectors, namely the vector $\vec{i}$ oriented to the left of the patient 1, the vector $\vec{j}$ oriented to the front and the vector $\vec{k}$ oriented to the bottom and colinear with the rotation axis 5. The aim of the invention is to improve the existing image reconstruction algorithms on the basis of shots taken by the camera 4 in order to make them usable in this general case. The geometrical relations (angles and distances) between the two series of elements are assumed to be known by a prior measurement of the type given in the remainder of the patent, no matter what their origin, constructional defect of the camera 4 or its support mechanism or the result of a voluntary choice of the inclination of the focal axis of the detector array. Account will not be taken here of parasitic phenomena such as the auto-attenuation of the radiation within the examined organism.

The situation will be that of analytical methods. The cartography of the emission or attenuation activity is described by a three-dimensional function f representing a plurality of parallel cross-sections. For each position of the focus F, each detector 6 is connected to the focus F by a single projection line. The conical geometry projection Xf associates with each of these lines an integral of the function f. The reconstruction amounts to solving the reverse problem, i.e. performing the transformations necessary for calculating f on the basis of Xf. The analysis tool is the 3D Radon transformation, defined as all the integral values on the planes in space. In practice, only the planes meeting the object are considered. With each plane P is associated its characteristic point C, namely the orthogonal projection of the origin O on said plane, and the spherical coordinates ($\rho$, $\vec{n}$) of said point C.

The point C, defined by its coordinates x,y and z in the object reference mark (OC=xi+yj+zk) can also be defined in spherical coordinates by the relation OC=$\rho\vec{n}$, in which $\vec{n}$ is a unit vector and $\rho$ a radius. It is then necessary to introduce the coordinates such as the longitude $\phi$ and the colatitude $\theta$ in order to define the orientation of the vector $\vec{n}$.

For a given position of the focal point F and for a plane passing through it, we have established an exact formula, linking the projection in conical geometry Xf with the primary derivative of the Radon transform R'f. The main operation consists of summating along the intersection line of the plane with the detector the primary derivatives of the projection. This makes it possible to allocate a value to all the planes passing through said position of the focal plane. After operating in this way for each measurement incidence, the rearrangement operation consists of redistributing these associated integral values with each plane of the coordinate system linked with the positions of the focal point on the spherical coordinate system of the Radon region. In order to again find the function f, it is necessary to invert the primary derivative of the Radon transform, as described in the first-mentioned patent. The algorithm is in two stages, firstly the bidimensional retroprojections in parallel geometry for each meridian of the Radon region, followed by bidimensional retroprojections in parallel geometry in accordance with the axial planes of the object.

The trajectory of the focal point is usually circular. By characterizing the information acquired by the planes encountering the trajectory, our analysis reveals the existence of a shadow area in the Radon region, linked with the planes encountering the object but not the trajectory. This shadow area is a source of artefacts on the reconstructed image. This explains why it is desirable for the focal plane to be centered on the region to be reconstructed. Our algorithm makes it possible to attenuate these distortions by filling said shadow area by interpolation.

In order to simplify the calculations, a parametrizing takes place on a detection plane Pdet parallel to the detector plane Pm to which the detectors 6 belong and which passes through the origin O. The calculations carried out on the detection plane Pdet are valid no matter what the distance from the plane of the detectors Pm, to within a magnification factor. A is a random point of the detection plane Pdet, G the orthogonal projection of the focal point F on the detection plane Pdet and Od, Ad, Gd the points of the plane of the detectors Pm such that F,O and Od on the one hand, F, A and Ad subsequently and F,G and Gd on the other hand are aligned. However, in the present case, G and O are separate unlike in the aforementioned patents. The calculations performed on the plane of the detectors Pm or, equivalently, on the detection plane Pdet using a mark of origin O, whose two vectors $\vec{u}$ and $\vec{v}$ are parallel to the two main directions (rows and columns) of the detector array 6 and whereof the third $\vec{w}$ is directed towards the focal point F in a perpendicular direction. This mark is called the acquisition mark.

Three rotation angles can be defined (FIG. 4) for describing the respective position of the object and acquisition marks. The precession angle $\Psi$ about the axis OK transforms the mark $\vec{Oijk}$ into an intermediate mark $Ou'j'k$. It is associated with the rotation of the camera 4 and the focus F on the trajectory T.

Figure 4:
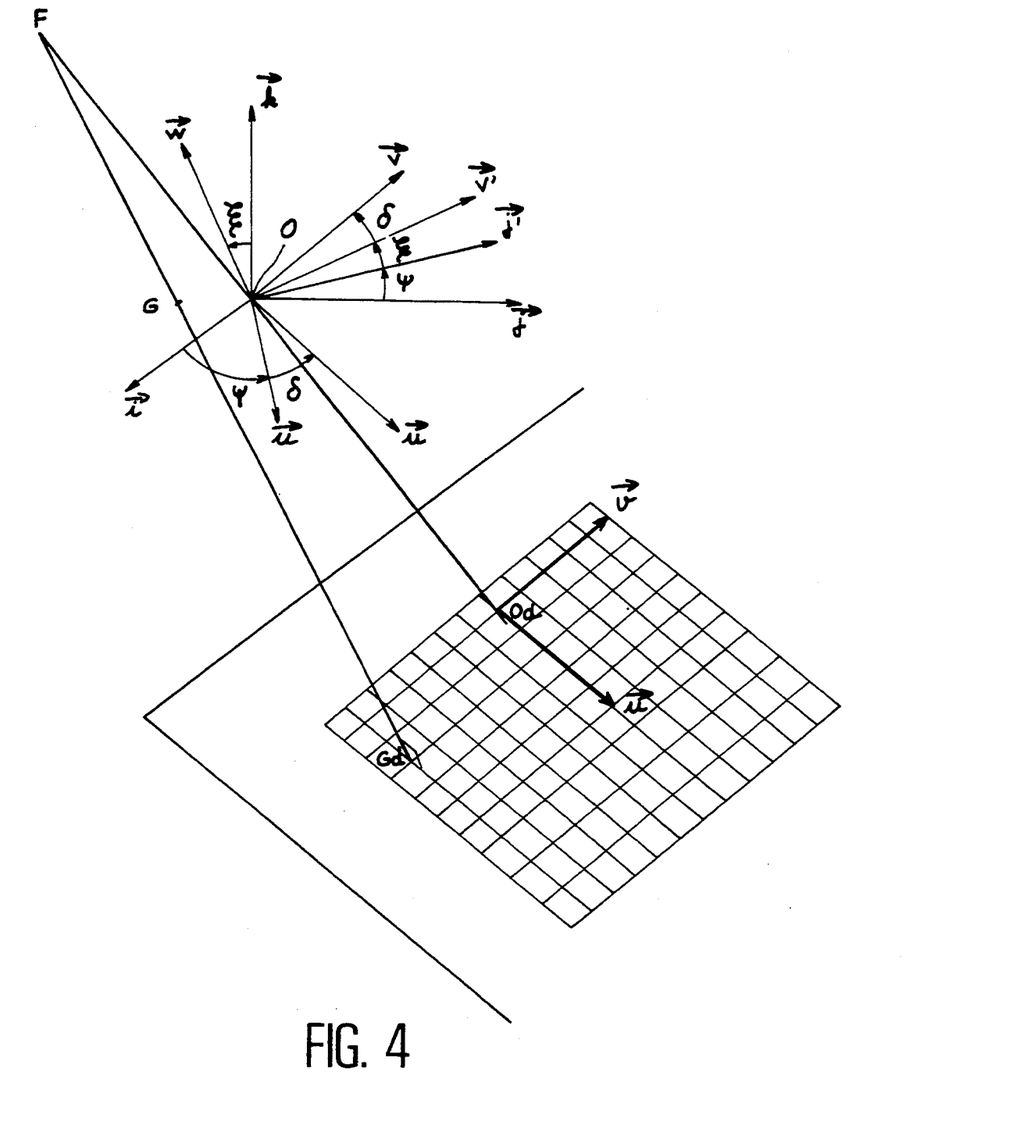

The nutation angle $\xi$ passes the mark $Ou'j'k$ to the mark $Ou'\vec{v}'\vec{w}$ and is therefore a rotation about the axis defined by the vector $\vec{u}'$ and expresses the inclination of the camera relative to the rotation axis 5.

The Eurlerian angle $\delta$ is a rotation about the axis defined by the vector $\vec{w}$ and the origin O and which passes from the mark $Ou'\vec{v}'\vec{w}$ to the mark $Ou\vec{v}\vec{w}$ and expresses the inclination of the rows of detectors 6 of the camera 4 with respect to the intersection of the plane of the trajectory T with the detector.

Figure 5:
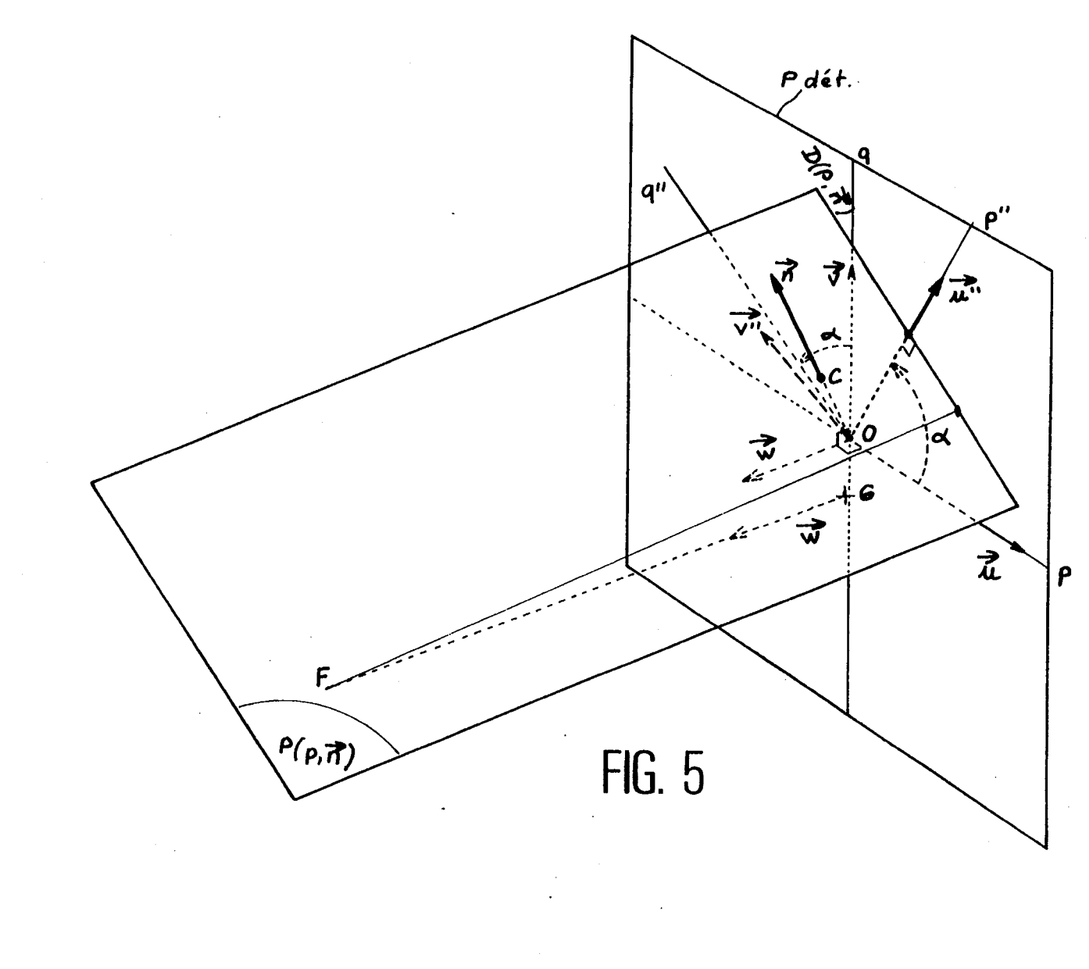
Figure 6:
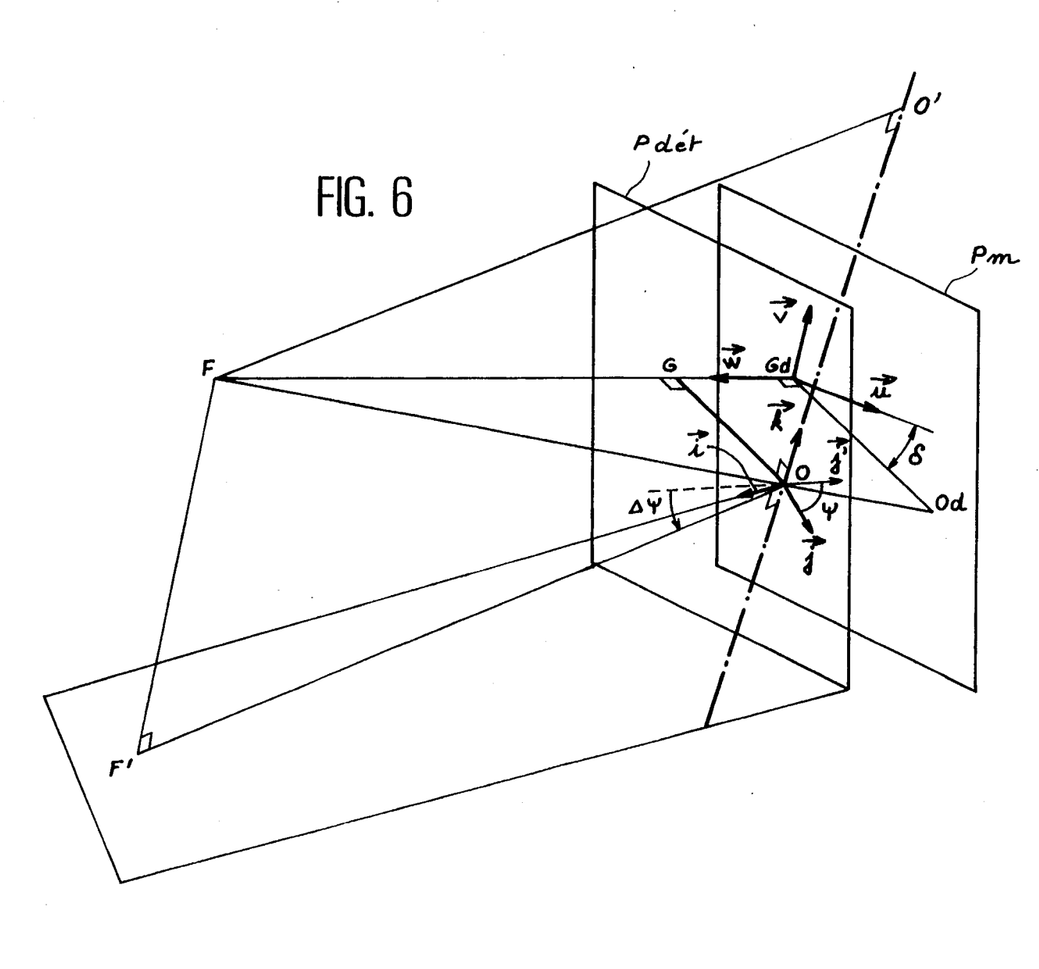

A precise knowledge of $\delta$ and in particular $\xi$ is necessary to avoid calculation imprecisions during reconstruction. The exact knowledge of $\Psi$ is useful for accurately knowing the precise position of the image with respect to the object, but imprecisions on this angle only lead to an orientation error of the reconstructed image. The vector $\vec{u}$, $\vec{v}$ and $\vec{w}$, which are linked with the camera 4 and the planes of detectors Pm and detection Pdet are illustrated in FIGS. 5 and 6, $\vec{u}$ and $\vec{v}$ belonging to these planes and are oriented respectively in the direction of the rows and columns of the detector 6 and $\vec{w}$ is orthogonal to said plane and directed towards the focus F. The point O is the coordinate origin of said mark.

The expression of the Radon transform is defined by the formula (1):

$$Rf(\vec{p,n}) = \int\int_{M \in P(\vec{p,n})} f(M) \, dM \quad (1)$$

that of its derivative by the formula (2):

$$R'f(\vec{p,n}) = \frac{\partial Rf}{\partial p}(\vec{p,n}) \quad (2)$$

and the expressions of their inversions by the formulas (3) and (4):

$$f(M) = -\frac{1}{8\pi^2} \cdot \int_{S^2} \frac{\partial^2 Rf}{\partial \rho^2} (\vec{OM} \cdot \vec{n}, \vec{n}) d\vec{n} \quad (3)$$

$$f(M) = -\frac{1}{8\pi^2} \cdot \int_{S^2} \frac{\partial R'f}{\partial \rho} (\vec{OM} \cdot \vec{n}, \vec{n}) d\vec{n} \quad (4)$$

The function forming the object of the transform is designated f, the actual transform by Rf, whilst M designates the points of the object mark and $S^2$ the unit vectors $\vec{n}$ in space.

If A is a random point of the intersection of a plane $P(\rho,\vec{n})$ and the detection plane Pdet and on calling $\vec{u}''$ and $\vec{v}''$ the vectors deduced from the vectors $\vec{u}$ and $\vec{v}$ by a rotation of angle $\alpha$ about the vector $\vec{w}$ so that the vector $\vec{v}''$ is directional of the line which constitutes said intersection, the formula (5):

$$R'f(\vec{OF} \cdot \vec{n}, \vec{n}) = \frac{\|\vec{GF}\|^2}{\|\vec{GFAn}\|^2} \int_{q''=-\infty}^{+\infty} \frac{\partial Yf}{\partial p''} (S, A(q'')) dq'' \quad (5)$$

expresses the value of the primary derivative of the Radon transform, p″ and q″ being the coordinates of the point A in the mark O $\vec{u}''\vec{v}''$ (OA=p″$\vec{u}''$+q″$\vec{v}''$) and Yf designates the projection Xf of the function measured on the radius from the focal point F to the point A following a weighting such that $$Yf(F,A) = \frac{\|\vec{FG}\|}{\|\vec{FA}\|} \cdot Xf(F,A)$$

Here O and G are separate, the vector $\vec{OF}$ is equal to $p_G\vec{u}+q_G\vec{v}+FG\vec{w}$, namely $(x'F)\vec{u}'+(y'F)\vec{j}'+(zF)\vec{k}$. The above definitions make it possible for us to obtain the equation system (6):

$$\begin{cases} x'_F = \cos\delta \cdot p_G - \sin\delta \cdot q_G \\ y'_F = \cos\xi \cdot \sin\delta \cdot p_G + \cos\xi \cdot \cos\delta \cdot q_G - \sin\xi \cdot FG \\ z_F = \sin\xi \cdot \sin\delta \cdot p_G + \sin\xi \cdot \cos\delta \cdot q_G + \cos\xi \cdot FG \end{cases} \quad (6)$$

and if $\Delta\Psi$ is the angle between $-\vec{j}'$ and OF′, in which F′ is the orthogonal projection of the focal plane F on the plane defined by the origin O and the vectors $\vec{i}$ and $\vec{j}$, it is relatively easily possible to deduce the equations (7) and (8) for a circular trajectory of the focal point F, it being possible to deduce other formulas for other forms of the trajectory T:

$$\begin{cases} \psi = \phi \cdot \Delta\psi + \arcsin\left[\frac{\rho - z_F \cdot \cos\theta}{OF \cdot \sin\theta}\right] \quad (7) \\ \psi = \phi + \pi \cdot \Delta\psi - \arcsin\left[\frac{\rho - z_F \cdot \cos\theta}{OF \cdot \sin\theta}\right] \quad (8) \end{cases}$$

On remarking that C($\rho$, $\theta$, $\phi$) is identical to C($\rho$, $-\theta$, $\phi+\pi$), it is possible to only use one of these equations, e.g. (7).

These equations (7) and (8) make it possible to obtain for each point of the characteristic volume of the object defined by its spherical coordinates $\rho$, $\theta$ and $\phi$ the values of the precession angle $\Psi$ for which the measurements contained in the associated plane and therefore the primary derivative of the Radon transform at this point can be obtained. There are generally two such angles, because the planes are generally secant at two points on a circular trajectory.

The interpolations for deducing the effective positions of the focal point F to be used for the calculation (these being positions adjacent to said position obtained by calculation using equations (7) and (8) and for which measurements have been carried out), as well as retro-projections for reconstructing the image at points expressed in the object mark on the basis of calculated sums are identical to those of the first-mentioned patent.

Figure 7:
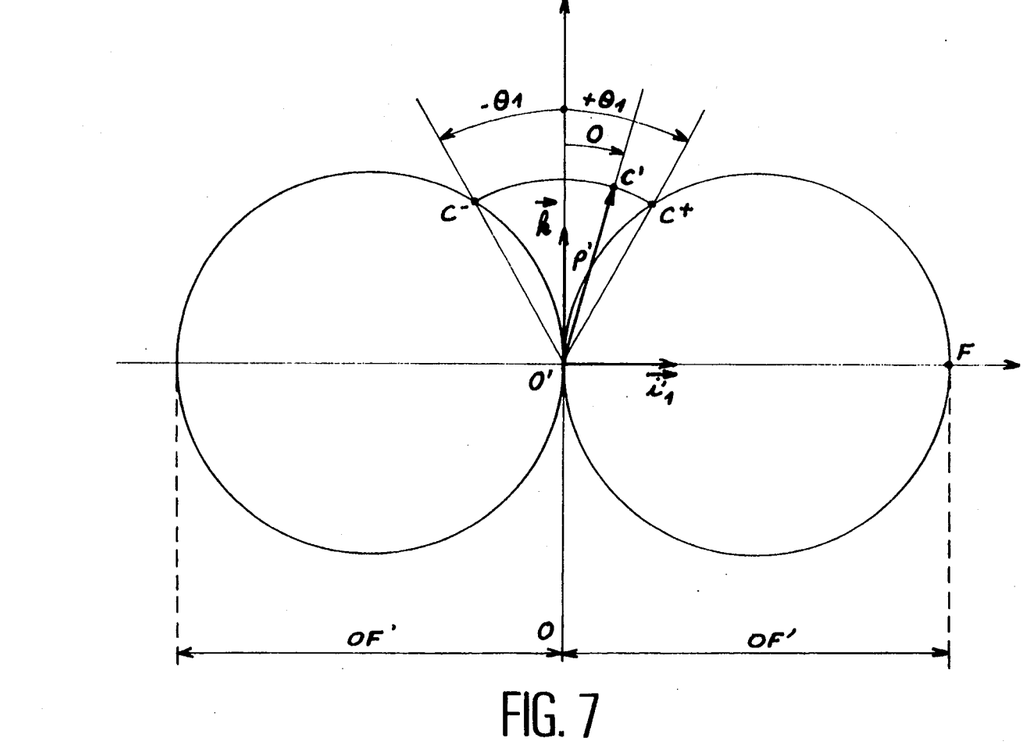

However, it is necessary to examine how the interpolations are to be carried out for filling the "shadow area" of the measurements before performing the inversion calculations. For this purpose reference should be made to FIG. 7. It is easily possible to demonstrate that if the trajectory of the focal point F is a circle, the characteristic points C' associated with planes on which the sum of the function f can be measured are included in a torus To obtained by the revolution of a circle of diameter O'F about the centre O' of the trajectory T. On designating by $\rho$, $\theta$ and $\phi$ the spherical coordinates of the point C' on the basis of the centre O' and with $\vec{O'C} = \rho \vec{n}$, and if $\vec{OO'} = zF \vec{k}$, it is possible to express the relation between $\rho'$ and $\theta$ by the formula:

$$\rho' = \rho - zF \cos \theta. \tag{9}$$

The principle adopted in the first-mentioned patent (the difference compared with the latter being that O and O' are separate) (zero order interpolation) consists of associating with a point C' of the shadow area the value measured on a point of a pair (C— or C+) at the limit of the shadow area and having the same radius $\rho'$ and the same longitude $\phi$. The colatitudes of these two points are $+\theta i$ and $-\theta i$. A choice will be made of the point whose colatitude is closest to $\theta$, in this case C+.

It is then sufficient to liken the value R'f ($\rho'$, $\theta$, $\phi$) of the point C' defined by its coordinates $\rho'$, $\theta$ and $\phi$ on the basis of the origin O' with the measured value R'f ($\rho i$, $\theta i$, $\rho i$) in which:

$$\rho i = \rho' + zF \left[ 1 - \frac{\rho'^2}{OF^2} \right]^{\frac{1}{2}} \tag{10}$$

$$\theta i = \pm \arc \sin \left( \frac{|\rho'|}{OF} \right) \text{ depending on whether C+ or C- is chosen}$$

and $\rho i = \rho$

However, all the calculations are only successfully performed if the geometrical parameters are known beforehand with an adequate accuracy to correctly describe the measurement acquisition system.

Certain parameters, namely the coordinates of the point Gd on the plane of detectors Pm, the focal distance FGd and the sampling distances separating the acquisition points on the detector can be evaluated by placing a grid or an identical design in front of the plane of the detectors and illuminating it with a plane source which can be a small reservoir filled with radioactive liquid in order to collect the image of the grid on the plane of the detectors. The grid is integrated into a mechanism making it possible to place it parallel to the plane of the detectors and at several distances. Therefore the image expands and contracts on the plane of the detectors Pm as a function of whether one approaches or moves away from the grid. The point Gd is the centre of the expansions and contractions, the magnification being evaluatable as a function of the distances of the grid from the plane of detectors Pm and the source and size of the image of the grid.

A device of this type is described in the article by Chang entitled "New Methods of Examining Gamma Camera Collimators" published in 1988 in The Journal of Nuclear Medicine, Vol. 29, No. 5, pp. 676 to 683.

It is possible to replace the single light source and the grid by an array of sources at the nodes of a virtual grid. The plate carrying the sources is placed at variable distances from the detectors 6 by a set of spacers.

The angles $\phi$, $\xi$ and $\delta$ and the distance FG can be obtained by a series of experiments, partly described in the article "Estimation of geometrical parameters and collimator evaluation for con-beam tomography", by Gullberg, Tsui, Crawford, Ballard and Hagius, published in 1990 in Medical Physics, No. 1712, according to which at least one fixed, point radiation source is used and the detector array is rotated in order to obtain a series of images of the source. The comparison of these images in conjunction with the locations where they were taken makes it possible to determine the three angles and deduce therefrom certain information on the collimation quality. An error or uncertainty minimization algorithm using a method of least squares can be used.

Finally, on using several detectors, the variation between the detectors is given by the difference between the precession angle $\Psi$ evaluated according to the aforementioned method for the same position of the point sources.

The invention can be very easily applied to cases where the focal point F and the camera 4 are moved on circular trajectories, but can also be applied to systems having several acquisition trajectories, like that described in the two aforementioned French patents. Finally, it is not only usable in algorithms employing the Radon transform of the function used for the reconstruction of the image or the primary derivative of said transform, but also in algorithms having a Hilbert transform of the Radon transform or its primary derivative.

We claim:

1. Process for the reconstruction of three-dimensional images of an object (3) defined by values assumed by a function (f) on points (M) of the object, the function being a property of a conical radiation having a focal point (F) passing through the object (3), in which the function is calculated by means of sums of the function on parametrized planes (P) passing through at least one point of the object and defined in an object mark (O, $\vec{i}$, $\vec{j}$, $\vec{k}$) having an origin (O), the process having at least one series of measurements carried out in different positions of the focal point about the object, each sum of the function on said parametrized planes in the object mark being calculated from at least one of the measurements, each of the measurements being carried out with a bidimensional array (4) of detectors (6) of the radiation oriented towards the focal point and which is displaced on a trajectory about the object perpendicular to a rotation axis, the focal point being displaced at the same time as the detector array so as to be projected orthogonally onto a fixed point (Gd) of the detector array, an inversion algorithm being used for finding again the value assumed by the function on the points of the object with the aid of sums of the function on the parametrized planes, the algorithm having stages of determining at least one position of the focal point belonging to each of the said associated parametrized planes, characterized in that the focal axis, defined as the orthogonal projection line (FGd) of the focal point on the array passes to one side of the origin (O) and in that the determination stages involve calculations using the parameters ($\Delta$, $\phi$, $\xi$) expressing the variation between the focal axis and the origin and the inclination between the focal axis and the rotation axis.

2. Process according to claim 1 and for a planar trajectory (T) of the focal point (F), characterized in that the parameters expressing the variation between the focal point and the origin incorporate the position of the orthogonal projection of the focal point (F) on a detection plane parallel to the detector array and passing through the origin (O) of the object mark.

3. Process according to claim 2, characterized in that the calculations of the determination stages of the parameterized planes involve at least one of the formulas $$\begin{cases} \psi = \phi \cdot \Delta\psi + \arcsin\left[\dfrac{\rho - z_F \cdot \cos\theta}{OF' \cdot \sin\theta}\right] & (7) \\ \psi = \phi + \pi \cdot \Delta\psi - \arcsin\left[\dfrac{\rho - z_F \cdot \cos\theta}{OF' \cdot \sin\theta}\right] & (8) \end{cases}$$

where $\rho$, $\theta$, $\phi$, are spherical coordinates, $\Psi$ is the precession angle, $z_F$ is the k-direction component of a vector from O to F, and OF' is the magnitude of a vector from the O to the orthogonal projection of F onto a plane defined by O and the i and j vectors, the trajectory of the focal point being circular.

4. Process according to claim 1, characterized in that the determination stages involve calculations using the rotation angle ($\delta$) of rows of detectors of the bidimensional array relative to the plane ($\overline{Oij}$) parallel to the trajectory.

5. Process according to claim 1, characterized in that the algorithm calculates for planes passing through the object and encountering the trajectory (T) of the focal point at at least one point the variation rate of the sum of the function on this plane on the basis of measurements carried out at this point.

6. Process according to claim 1, characterized in that the result of the function sums comprises a Hilbert transform.

7. Process according to claim 1, in which the planar detector array rotates about the head of a patient (1), characterized in that the detector array is inclined towards the body of the patient and mechanical settings are made so that the focal point (F) follows a trajectory passing through a region of interest around the head of the patient.

8. Process according to claim 1, characterized in that the inclination between the focal axis and the rotation axis is of a random nature.

9. Process according to claim 1, characterized in that it comprises a complement stage of a plurality of values (R'f) associated with points of the object and obtained by calculations performed on sums of the function on parametrized planes by values associated with other points (C') of the object and obtained by interpolating values obtained by calculations and associated with points (C+, C−) of the object chosen as a function of coordinates of said other points with respect to an intersection (O') between a plane in which the trajectory of the focal point is included and the rotation axis.

* * * * *

UNITED STATES PATENT AND TRADEMARK OFFICE
CERTIFICATE OF CORRECTION

PATENT NO. : 5,408,511
DATED : April 18, 1995
INVENTOR(S) : Grangeat, et. al.

It is certified that error appears in the above-indentified patent and that said Letters Patent is hereby corrected as shown below:

Column 6, lines 56 and 5a, and and in claim 3, column 9, lines 2a and 32, "Of.$\theta$sin " should be --OF'. sin $\theta$ --.

Signed and Sealed this

Twenty-fourth Day of October, 1995

Attest:

BRUCE LEHMAN

*Attesting Officer*  *Commissioner of Patents and Trademarks*